US011008733B2

(12) United States Patent
Sugano et al.

(10) Patent No.: US 11,008,733 B2
(45) **Date of Patent: *May 18, 2021**

(54) ENERGY REGENERATION DEVICE AND WORK MACHINE PROVIDED WITH ENERGY REGENERATION DEVICE

(71) Applicant: Kobe Steel, Ltd., Kobe (JP)

(72) Inventors: Naoki Sugano, Kobe (JP); Satoshi Maekawa, Kobe (JP)

(73) Assignee: Kobe Steel, Ltd., Kobe (JP)

(*) Notice: Subject to any disclaimer, the term of this patent is extended or adjusted under 35 U.S.C. 154(b) by 182 days.

This patent is subject to a terminal disclaimer.

(21) Appl. No.: 16/323,538

(22) PCT Filed: Aug. 9, 2017

(86) PCT No.: PCT/JP2017/029001
§ 371 (c)(1),
(2) Date: Feb. 6, 2019

(87) PCT Pub. No.: WO2018/037925
PCT Pub. Date: Mar. 1, 2018

(65) Prior Publication Data

US 2019/0169820 A1 Jun. 6, 2019

(30) Foreign Application Priority Data

Aug. 22, 2016 (JP) ............................. JP2016-161687

(51) Int. Cl.
*G06F 7/70* (2006.01)
*G06G 7/00* (2006.01)
(Continued)

(52) U.S. Cl.
CPC .............. *E02F 9/2203* (2013.01); *E02F 9/20* (2013.01); *E02F 9/22* (2013.01); *E02F 9/2253* (2013.01);
(Continued)

(58) Field of Classification Search
CPC ... E02F 9/2203; E02F 9/20; E02F 9/22; E02F 9/2253; F15B 11/04; F15B 11/08; F15B 21/14
(Continued)

(56) References Cited

U.S. PATENT DOCUMENTS

2007/0280400 A1* 12/2007 Keller ..................... F01K 23/16 376/317
2013/0207451 A1* 8/2013 Ohkubo ................ B60T 8/5081 303/9.62
2017/0241445 A1* 8/2017 Shang ....................... F15B 1/04

FOREIGN PATENT DOCUMENTS

JP 2014-163419 A 9/2014
JP 2014163419 A * 9/2014

OTHER PUBLICATIONS

English Translation for JP2014163419A.*
International Search Report dated Oct. 17, 2017 in PCT/JP2017/029001 filed on Aug. 9, 2017.

* cited by examiner

*Primary Examiner* — Mahmoud S Ismail
(74) *Attorney, Agent, or Firm* — Oblon, McClelland, Maier & Neustadt, L.L.P.

(57) ABSTRACT

An energy regeneration device which can regenerate energy of a working fluid discharged from an actuator while controlling a flow rate of the working fluid, and a work machine including the device. The regeneration device includes a boom cylinder, an inertial fluid container, an oil tank, an accumulator, a low-pressure-side opening/closing device, and a high-pressure-side opening/closing device. A calculation unit calculates an opening area of each of the low-pressure-side opening/closing device and the high-pressure-side opening/closing device in accordance with a desired flow rate of a hydraulic fluid discharged from the boom
(Continued)

cylinder. A regeneration control unit adjusts an opening area of each of the low-pressure-side opening/closing device and the high-pressure-side opening/closing device, and selects alternately the low-pressure-side opening/closing device and the high-pressure-side opening/closing device as a destination with which the inertial fluid container communicates, to supply a discharged hydraulic fluid to an accumulator.

6 Claims, 9 Drawing Sheets

(51) Int. Cl.
*G06G 7/76* (2006.01)
*E02F 9/22* (2006.01)
*F15B 11/04* (2006.01)
*F15B 11/08* (2006.01)
*F15B 21/14* (2006.01)
*E02F 9/20* (2006.01)

(52) U.S. Cl.
CPC .............. *F15B 11/04* (2013.01); *F15B 11/08* (2013.01); *F15B 21/14* (2013.01)

(58) Field of Classification Search
USPC ........................................................... 701/50
See application file for complete search history.

ENERGY REGENERATION DEVICE AND WORK MACHINE PROVIDED WITH ENERGY REGENERATION DEVICE

BACKGROUND OF THE INVENTION

Field of the Invention

The present invention relates to an energy regeneration device which regenerates energy of a working fluid discharged from an actuator, and a work machine including the foregoing device.

Description of the Related Art

Conventionally, as a means for regulating a flow rate of a hydraulic fluid in a hydraulic circuit of a work machine, a technique of controlling a flow rate of passage of a hydraulic fluid by a throttle effect of a valve, is known. Also, an energy regeneration apparatus in which pressure energy of a hydraulic fluid discharged from an actuator is recovered in an accumulator is known. Since a hydraulic fluid flows from a high-pressure side to a low-pressure side, it is difficult to recover a hydraulic fluid on an accumulator side in a case where a pressure of the accumulator is equal to or higher than a pressure on an actuator side. Accordingly, a pressure of an accumulator should be set to be lower than a pressure on an actuator side in order to stably recover a hydraulic fluid in the accumulator. Further, in order to reduce a range of variation in an internal pressure of an accumulator, it is necessary to increase a capacity of the accumulator. Thus, an accumulator is increased in a size, which invites a problem of increase in a size and a cost of an apparatus.

Meanwhile, Patent Literature 1 discloses an inertial fluid container which can communicate with a discharge side of an actuator, and a technique in which the inertial fluid container is caused to communicate with a high-pressure-side container and a low-pressure-side container alternately, so that energy of a working fluid is recovered in the high-pressure-side container with the use of inertia of a fluid.

In the foregoing energy regeneration apparatus, when a high-pressure-side opening/closing device is closed and a low-pressure-side opening/closing device is opened, a working fluid flows into a low-pressure-side container from an inertial fluid container. At that time, because of flow of a working fluid, an inertial force of fluid is generated in the inertial fluid container. Thereafter, when the low-pressure-side opening/closing device is closed and the high-pressure-side opening/closing device is opened, a working fluid flows into an accumulator due to the inertial force of fluid generated in the inertial fluid container. As a result of this, a pressure of a working fluid can be accumulated in the accumulator.

In a work machine used in a construction site or the like, an operation speed of a hydraulically-driven actuator is controlled in accordance with an amount of operation performed on an operation lever by an operator. In the technique described in Patent Literature 1, in regenerating energy of a working fluid, it is impossible to control an operation speed of a hydraulically-driven actuator such that it becomes equal to a desired speed. Accordingly, an amount of operation of the operation lever and an operation speed of a hydraulically-driven actuator are unlikely to correspond to each other.

CITATION LIST

Patent Literature

Patent Literature 1: JP 2014-163419 A

BRIEF SUMMARY OF THE INVENTION

It is an object of the present invention to provide an energy regeneration device which can regenerate energy of a working fluid discharged from an actuator while controlling a flow rate of the working fluid, and a work machine including the foregoing device.

Provided is an energy regeneration device for regenerating energy of a working fluid, the device including an actuator, an inertial fluid container, a low-pressure-side container, a high-pressure-side container, a low-pressure-side opening/closing device, a high-pressure-side opening/closing device, a first pressure obtaining unit, a second pressure obtaining unit, a calculation unit, and an opening/closing-device control unit. The actuator includes a cylinder and a piston that is reciprocatable in the cylinder. A volume of a cylinder fluid chamber delimited by the cylinder and the piston varies along with movement of the piston. The inertial fluid container includes a first internal space that is configured to communicate with the cylinder fluid chamber, and is configured to receive the working fluid that is discharged from the cylinder fluid chamber due to the movement of the piston. The low-pressure-side container includes a second internal space that is set at a pressure lower than that of the cylinder fluid chamber and is configured to communicate with the first internal space of the inertial fluid container, and the low-pressure-side container is configured to receive the working fluid flowing out of the inertial fluid container. The high-pressure-side container includes a third internal space that is set at a pressure higher than that of the second internal space of the low-pressure-side container and is configured to communicate with the first internal space of the inertial fluid container, and the high-pressure-side container is configured to receive the working fluid flowing out of the inertial fluid container. The low-pressure-side opening/closing device forms a low-pressure-side opening that is configured to permit circulation of the working fluid between the inertial fluid container and the low-pressure-side container, and the low-pressure-side opening/closing device is configured to operate to vary an opening area of the low-pressure-side opening. The high-pressure-side opening/closing device forms a high-pressure-side opening that is configured to permit circulation of the working fluid between the high-pressure-side container and the inertial fluid container, and the high-pressure-side opening/closing device is configured to operate to vary an opening area of the high-pressure-side opening. The first pressure obtaining unit is configured to obtain a discharge pressure of the working fluid upstream of the inertial fluid container in flow of the working fluid flowing out of the cylinder fluid chamber. The second pressure obtaining unit is configured to obtain a high-pressure-side pressure of the working fluid downstream of the high-pressure-side opening/closing device in the flow of the working fluid flowing out of the cylinder fluid chamber. The calculation unit is configured to calculate a desired opening area of each of the low-pressure-side opening and the high-pressure-side opening for a case where the piston moves at a predetermined moving speed in such a direction as to reduce the volume of the cylinder fluid chamber. The calculation unit is configured to calculate the desired opening area of each of the high-pressure-side opening and the low-pressure-side opening based on a duty ratio for controlling an open time of each of the low-pressure-side opening and the high-pressure-side opening in a predetermined period, a desired flow rate of the working fluid discharged from the cylinder fluid chamber, the desired flow rate being set in accordance with the moving speed of the piston, the discharge pressure obtained by the first pressure obtaining unit, and the high-pressure-side pressure obtained by the second pressure obtaining unit. The opening/closing-device control unit is configured to set the opening area of each of the high-pressure-side opening and the low-pressure-side opening to the desired opening area, and control an opening/closing operation of the high-pressure-side opening/closing device and the low-pressure-side opening/closing device in accordance with the duty ratio such that the low-pressure-side container and the high-pressure-side container are alternately selected as a destination with which the inertial fluid container communicates, to cause the working fluid to flow into the high-pressure-side container due to an inertial force that is generated in the first internal space of the inertial fluid container when the working fluid flows toward the low-pressure-side container, while causing the piston to move at the moving speed.

Also, provided is a work machine which includes an engine; the above-described energy regeneration device; a driven object connected to the piston of the actuator; a pump being configured to be driven by the engine and drive the driven object connected to the piston by supplying the working fluid to the cylinder fluid chamber of the actuator; and an operation lever configured to operate the driven object. Then, the desired flow rate of the working fluid is set in accordance with an amount of operation of the operation lever.

DETAILED DESCRIPTION OF THE INVENTION

Figure 1:
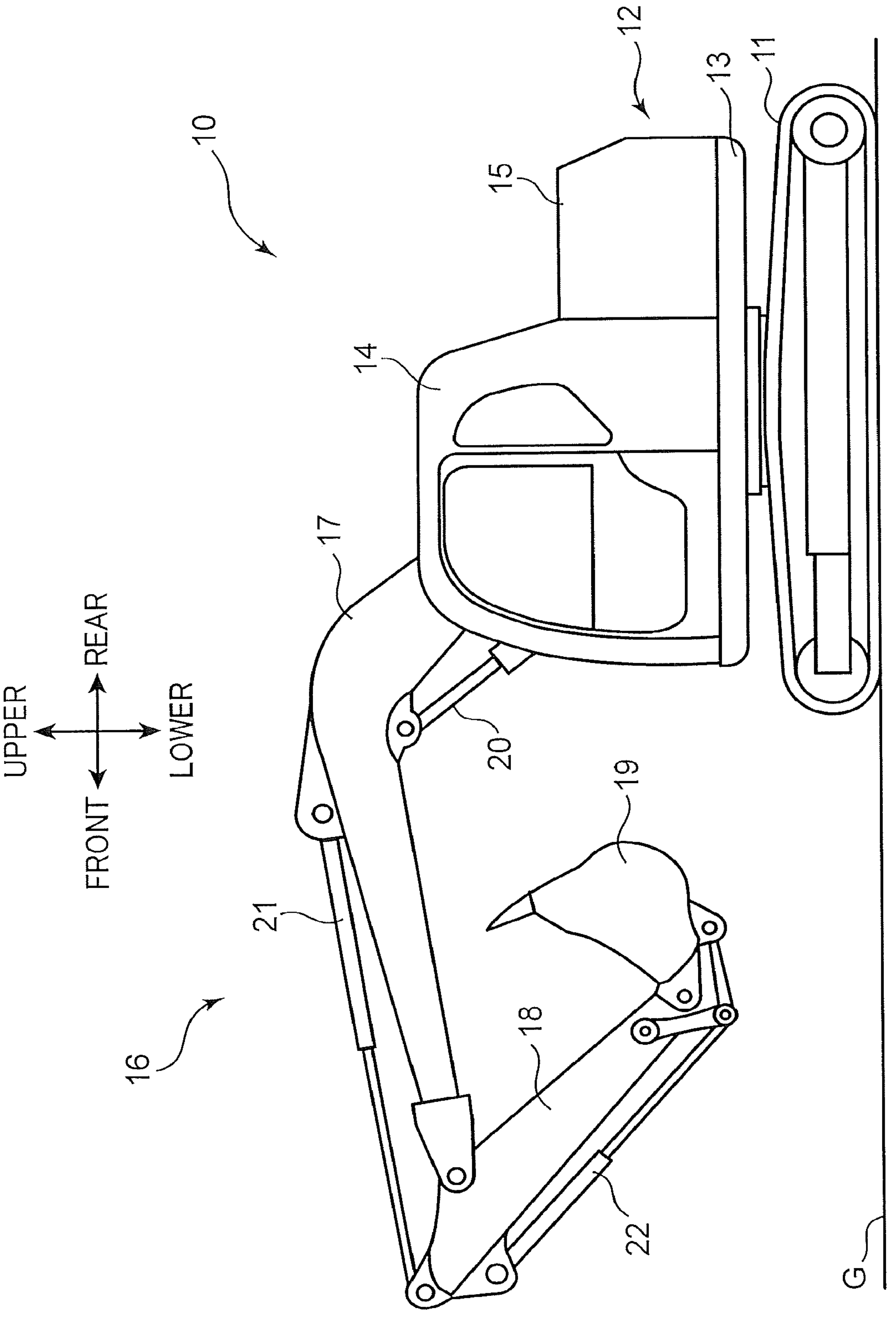
FIG. 1 is a schematic side view of a work machine according to one embodiment of the present invention.

Hereinafter, with reference to the drawings, each of embodiments of the present invention will be described. FIG. 1 is a side view of a hydraulic excavator 10 (work machine) according to one embodiment of the present invention. It is noted that directions such as "upper", "lower, "left", "right", "front" and "rear", which will be shown below in the drawings, are shown for the sake of convenience in explaining a configuration of the hydraulic excavator 10 according to the present embodiment, and do not limit a use form or the like of the hydraulic excavator 10.

The hydraulic excavator 10 includes a lower travelling body 11 and an upper slewing body 12 which is supported on the lower travelling body 11 in such a manner that the upper slewing body 12 can slew around a vertical axis. The lower travelling body 11 and the upper slewing body 12 form a base of the hydraulic excavator 10. The upper slewing body 12 includes an upper frame 13, and also includes a cab 14 and a counter weight 15 which are provided on the upper frame 13. The upper frame 13 is formed of a plate-shaped member which extends horizontally. The cab 14 is equipped with an operation unit or the like which is operated by an operator of the hydraulic excavator 10. The counter weight 15 is provided in a rear portion of the upper frame 13, and has a function of keeping balance of the hydraulic excavator 10.

Further, in a front portion of the upper frame 13, a working attachment 16 is mounted. The working attachment 16 is supported on the upper frame 13 by a supporting mechanism not shown in the drawings. The working attachment 16 includes a boom 17 which is mounted in the upper slewing body 12 in such a manner that the boom 17 can rise and fall, an arm 18 which is turnably connected to a distal end of the boom 17, and a bucket 19 which is turnably connected to a distal end of the arm 18.

In the working attachment 16, a boom cylinder 20 which is a hydraulic actuator for a boom, an arm cylinder 21 which is a hydraulic actuator for an arm, and a bucket cylinder 22 which is a hydraulic actuator for a bucket are mounted, and those cylinders include hydraulic cylinders which can telescope. The boom cylinder 20 is interposed between the boom 17 and the upper slewing body 12 so that the boom cylinder 20 telescopes in response to receive a hydraulic fluid and causes the boom 17 to turn in a direction in which the boom 17 rises and falls. The arm cylinder 21 is interposed between the arm 18 and the boom 17 so that the arm cylinder 21 telescopes in response to receive a hydraulic fluid and causes the arm 18 to turn about a horizontal axis with respect to the boom 17. Further, the bucket cylinder 22 is interposed between the bucket 19 and the arm 18 so that the bucket cylinder 22 telescopes in response to receive a hydraulic fluid and causes the bucket 19 to turn about a horizontal axis with respect to the arm 18.

It should be noted that a work machine to which the present invention is applied is not limited to the hydraulic excavator 10. The present invention is widely applicable to work machines each including a driven object which is driven by a fluid pressure such as a hydraulic pressure. It is also noted that a crusher, a disassembling machine, and the like in addition to a bucket can be employed as a working attachment.

Figure 2:
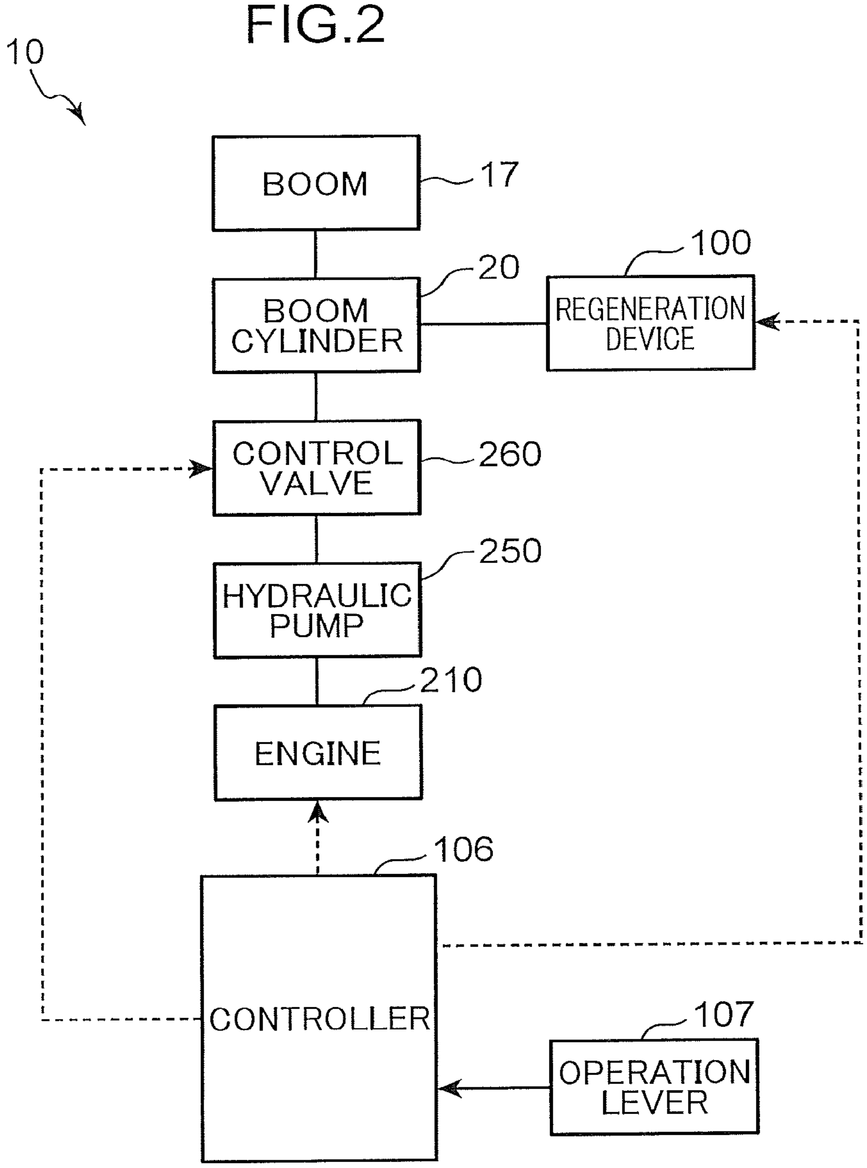
FIG. 2 is a block diagram showing one example of a system configuration of the work machine shown in FIG. 1.

FIG. 2 is a block diagram showing an example of a system configuration of the hydraulic excavator 10 shown in FIG. 1. The hydraulic excavator 10 includes an engine 210, a hydraulic pump 250 connected to an output shaft of the engine 210, a control valve 260 which controls charge/discharge of a hydraulic fluid from the boom cylinder 20 to the hydraulic pump 250, a controller 106, and an operation lever 107.

The hydraulic pump 250 operates under power of the engine 210, and discharges a hydraulic fluid. A hydraulic fluid discharged from the hydraulic pump 250 is supplied to a head-side hydraulic chamber 203 (FIG. 3) or a rod-side hydraulic chamber 204, which will be later described, in the boom cylinder 20, with a flow rate thereof being controlled by the control valve 260. As a result of this, the boom 17 connected to a piston 202A (FIG. 3) of the boom cylinder 20 is driven. Additionally, the control valve 260 is electrically controlled by the controller 106, and includes a pilot-operated hydraulic selector valve (pilot valve) and a proportional solenoid valve. The pilot valve includes a pilot port not shown in the drawings. The pilot valve operates to open a valve in accordance with a pilot pressure input to the pilot port, and changes a flow rate of a hydraulic fluid supplied to the boom cylinder 20. Also, the pilot valve switches a destination of supply of a hydraulic fluid between the head-side hydraulic chamber 203 (FIG. 3) and the rod-side hydraulic chamber 204 of the boom cylinder 20. The proportional solenoid valve regulates a flow rate of oil for a pilot, the oil flowing into the pilot valve, in accordance with a control signal provided from the controller 106, in order to change a pilot pressure input to the pilot valve.

The controller 106 outputs a control signal for setting an opening degree of the proportional solenoid valve of the above-described control valve 260 in accordance with an amount of operation of the operation lever 107. The operation lever 107 is installed inside the cab 14 and is operated by an operator. The operation lever 107 is operated so that the operation lever 107 operates the working attachment 16 including the boom 17.

The boom cylinder 20 telescopes in response to supply of a hydraulic fluid. It is noted that though FIG. 2 shows that the control valve 260 is placed between the boom cylinder 20 and the hydraulic pump 250, the control valve 260 configured similarly is placed also between each of the arm cylinder 21 and the bucket cylinder 22 in FIG. 1, and the hydraulic pump 250. Each cylinder is configured so as to be independently controllable in response to a control signal of the controller 106.

Figure 3:
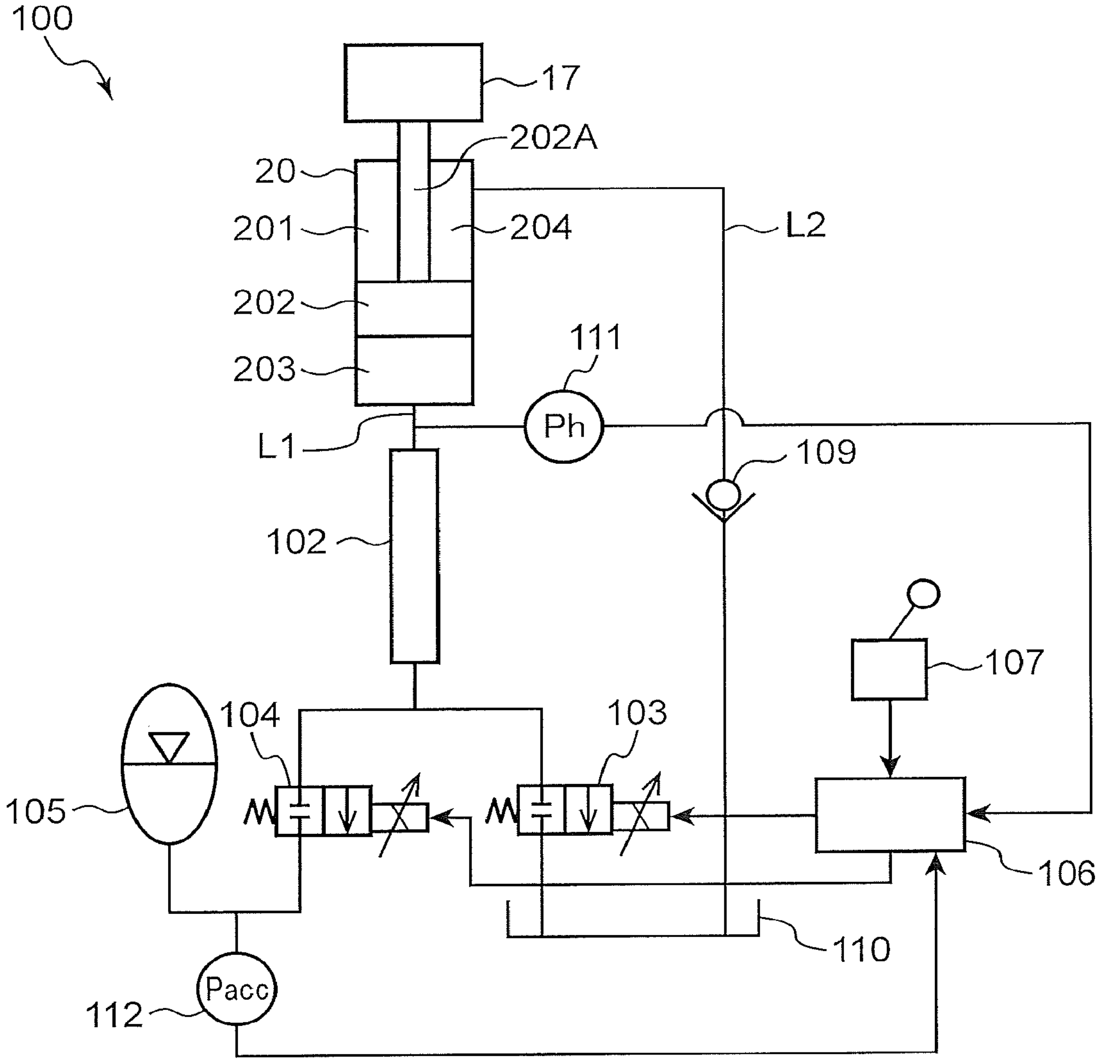
FIG. 3 is a hydraulic circuit diagram of an energy regeneration device included in the work machine according to the one embodiment of the present invention.
Figure 4:
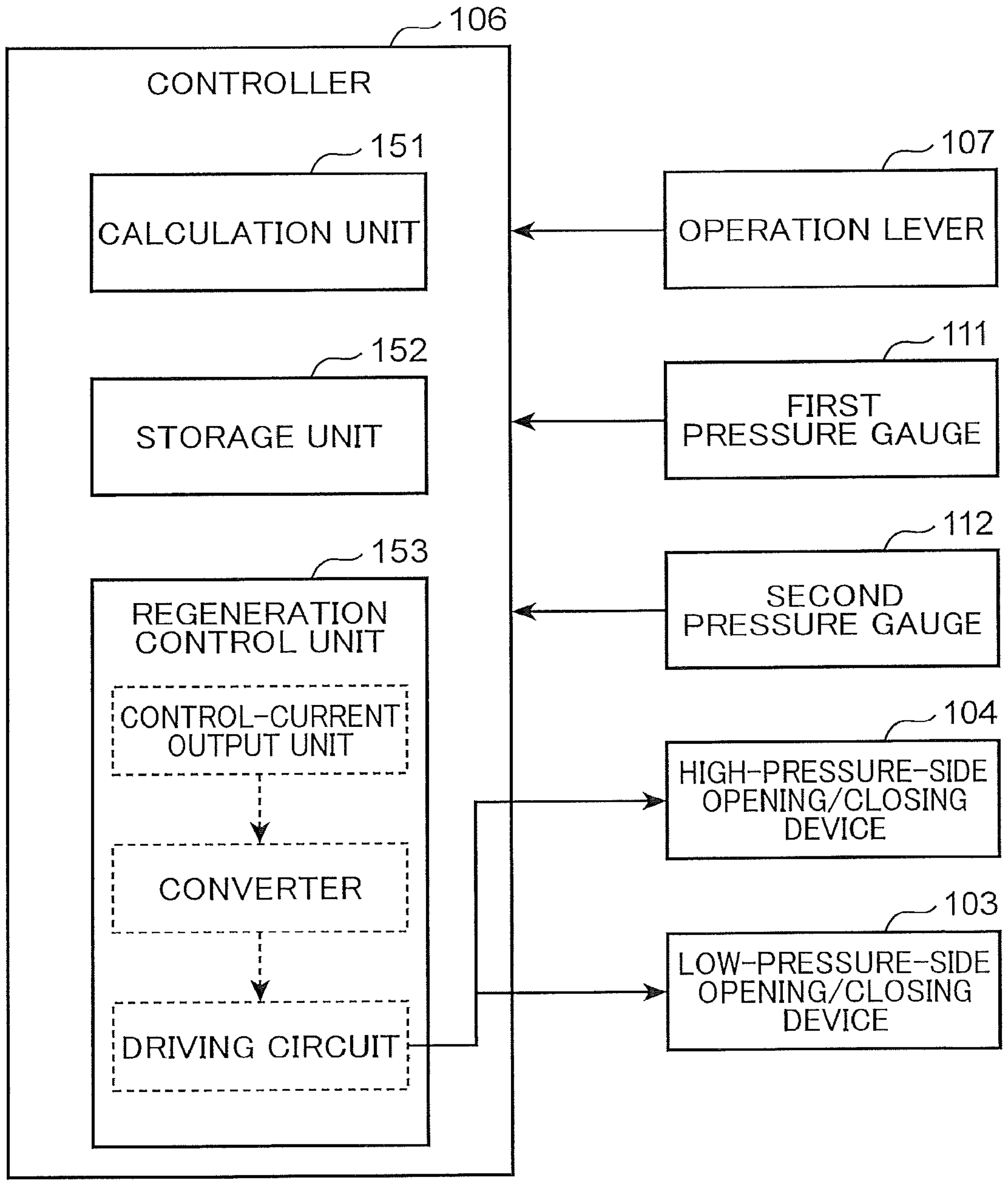
FIG. 4 is a block diagram of a controller of the work machine according to the one embodiment of the present invention.

Further, as shown in FIG. 2, the hydraulic excavator 10 includes a regeneration device 100 (energy regeneration device). The regeneration device 100 has a function of regenerating energy of a hydraulic fluid discharged from the boom cylinder 20. FIG. 3 is a hydraulic circuit diagram of the regeneration device 100. FIG. 4 is a block diagram of the controller 106.

The regeneration device 100 includes an inertial fluid container 102, a low-pressure-side opening/closing device 103, a high-pressure-side opening/closing device 104, an accumulator 105 (high-pressure-side container), a check valve 109, an oil tank 110 (low-pressure-side container), a first pressure gauge 111 (first pressure obtaining unit), and a second pressure gauge 112 (second pressure obtaining unit), in addition to the boom cylinder 20 (actuator) and the controller 106 which have already been mentioned.

The aforementioned boom cylinder 20 includes a cylinder 201, a piston 202, and a piston rod 202A. The piston 202 is configured so as to be reciprocatable in the cylinder 201. The cylinder 201 and the piston 202 delimit the head-side hydraulic chamber 203 (cylinder fluid chamber) and the rod-side hydraulic chamber 204. One side surface of the piston 202 is connected to the piston rod 202A. A distal end of the piston rod 202A is connected to the aforementioned boom 17 (driven object) which serves as a working load of the boom cylinder 20.

The head-side hydraulic chamber 203 is formed in the cylinder 201, and is sealed with a hydraulic fluid (working fluid) being charged therein. A volume of the head-side hydraulic chamber 203 varies along with reciprocation of the piston 202. Likewise, the rod-side hydraulic chamber 204 is formed in the cylinder 201 and is sealed with a hydraulic fluid being charged therein. A volume of the rod-side hydraulic chamber 204 can vary along with reciprocation of the piston 202. More specifically, in FIG. 3, when the piston 202 moves upward, a volume of the head-side hydraulic chamber 203 is increased and a volume of the rod-side hydraulic chamber 204 is reduced. On the other hand, when the piston 202 moves downward, a volume of the head-side hydraulic chamber 203 is reduced and a volume of the rod-side hydraulic chamber 204 is increased.

The inertial fluid container 102 includes an internal space (first internal space) which communicates with the head-side hydraulic chamber 203 of the boom cylinder 20. The inertial fluid container 102 receives a hydraulic fluid which is discharged from the head-side hydraulic chamber 203 due to movement of the piston 202. In the present embodiment, the inertial fluid container 102 includes a pipe having a predetermined inside diameter.

The oil tank 110 includes an internal space (second internal space) which is set at a pressure lower than that of the head-side hydraulic chamber 203 of the boom cylinder 20. The internal space of the oil tank 110 can communicate with the internal space of the inertial fluid container 102. The oil tank 110 receives a hydraulic fluid which flows out of the inertial fluid container 102. The accumulator 105 includes an internal space (third internal space) which is set at a pressure higher than that of the internal space of the oil tank 110. The internal space of the accumulator 105 can communicate with the internal space of the inertial fluid container 102. The accumulator 105 receives a hydraulic fluid which flows out of the inertial fluid container 102. At that time, the accumulator 105 accumulates a pressure of a hydraulic fluid.

The low-pressure-side opening/closing device 103 is a metering valve which is placed between the inertial fluid container 102 and the oil tank 110. The low-pressure-side opening/closing device 103 forms a not-shown opening (low-pressure-side opening) which permits circulation of a hydraulic fluid between the inertial fluid container 102 and the oil tank 110. That is, the low-pressure-side opening/closing device 103 allows the inertial fluid container 102 and the oil tank 110 to communicate with each other, or interrupts communication therebetween. Then, the low-pressure-side opening/closing device 103 operates to vary an opening area of the above-described opening.

Likewise, the high-pressure-side opening/closing device 104 is a metering valve which is placed between the inertial fluid container 102 and the accumulator 105. The high-pressure-side opening/closing device 104 forms a not-shown opening (high-pressure-side opening) which permits circulation of a hydraulic fluid between the inertial fluid container 102 and the accumulator 105. That is, the high-pressure-side opening/closing device 104 allows the inertial fluid container 102 and the accumulator 105 to communicate with each other, or interrupts communication therebetween. Then, the high-pressure-side opening/closing device 104 operates to vary an opening area of the above-described opening. Additionally, an opening area of each of the low-pressure-side opening of the low-pressure-side opening/closing device 103 and the high-pressure-side opening of the high-pressure-side opening/closing device 104 is controlled by the controller 106.

The first pressure gauge 111 detects (obtains) a discharge pressure Ph of a hydraulic fluid located on a side closer to the head-side hydraulic chamber 203 of the boom cylinder 20 with respect to the inertial fluid container 102. In other words, the first pressure gauge 111 detects the discharge pressure Ph of a hydraulic fluid located upstream of the inertial fluid container 102 in flow of a hydraulic fluid flowing out of the head-side hydraulic chamber 203. Also, the second pressure gauge 112 detects (obtains) a high-pressure-side pressure Pace of a hydraulic fluid located on a side closer to the accumulator 105 with respect to the high-pressure-side opening/closing device 104. In other words, the second pressure gauge 112 detects the high-pressure-side pressure Pace of a hydraulic fluid located downstream of the high-pressure-side opening/closing device 104 in flow of a hydraulic fluid flowing out of the head-side hydraulic chamber 203.

Additionally, in the hydraulic excavator 10, a head-side oil path L1 and a rod-side oil path L2 are placed. Along the head-side oil path L1, a hydraulic fluid passes from the head-side hydraulic chamber 203 of the boom cylinder 20 to the low-pressure-side opening/closing device 103 or the accumulator 105 through the inertial fluid container 102. Along the rod-side oil path L2, a hydraulic fluid passes from the rod-side hydraulic chamber 204 to the oil tank 110. The check valve 109 has a function of making up for a shortage of a flow rate for the boom cylinder 20 with the oil tank 110 (anti-cavitation checking function) when a boom operates to move downward.

With reference to FIG. 4, the controller 106 is configured to control the hydraulic excavator 10 in a centralized manner, and is electrically connected to the operation lever 107, the first pressure gauge 111, the second pressure gauge 112, the low-pressure-side opening/closing device 103, the high-pressure-side opening/closing device 104, and the like, as a transmitter or receiver of a control signal. The controller 106 includes a central processing unit (CPU), a read only memory (ROM) in which a control program is stored, a random access memory (RAM) which is used as a work-space of the CPU, and the like, and operates by execution of the control program in the CPU in such a manner that the controller 106 functionally includes a calculation unit 151, a storage unit 152, and a regeneration control unit 153 (opening/closing-device control unit).

The calculation unit 151 calculates a desired opening area A1 of each of the low-pressure-side opening/closing device 103 and the high-pressure-side opening/closing device 104, the desired opening area A1 depending on a desired flow rate Q1 of a hydraulic fluid discharged from the head-side hydraulic chamber 203 of the boom cylinder 20, as described later in detail. In the storage unit 152, information about the desired flow rate Q1 of a hydraulic fluid in accordance with an amount of operation of the operation lever 107 is stored. Also, in the storage unit 152, an opening-area threshold value AC (threshold value) which is previously set so as to comply with a condition where a hydraulic fluid will flow back from the accumulator 105 toward the inertial fluid container 102 is stored. Those pieces of information are output from the storage unit 152 as needed.

The regeneration control unit 153 sets an opening area of each of the low-pressure-side opening/closing device 103 and the high-pressure-side opening/closing device 104 to the above-described desired opening area A1 when the piston 202 moves in such a manner that a volume of the head-side hydraulic chamber 203 of the boom cylinder 20 is reduced. Also, the regeneration control unit 153 controls an opening/closing operation of the low-pressure-side opening/closing device 103 and the high-pressure-side opening/closing device 104 in such a manner that the oil tank 110 and the accumulator 105 are alternately selected as a destination with which the inertial fluid container 102 communicates.

Figure 5:
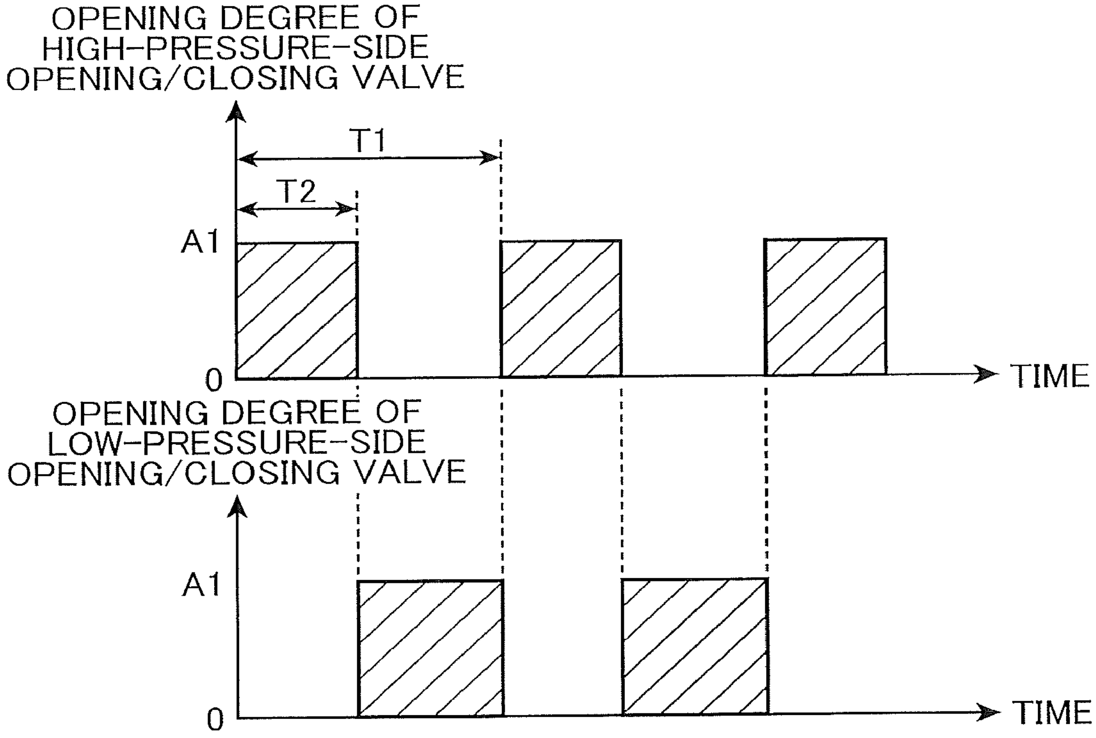
FIG. 5 includes graphs showing relationships each between an open time and an opening degree of opening/closing devices included in the energy regeneration device according to the one embodiment of the present invention.
Figure 6:
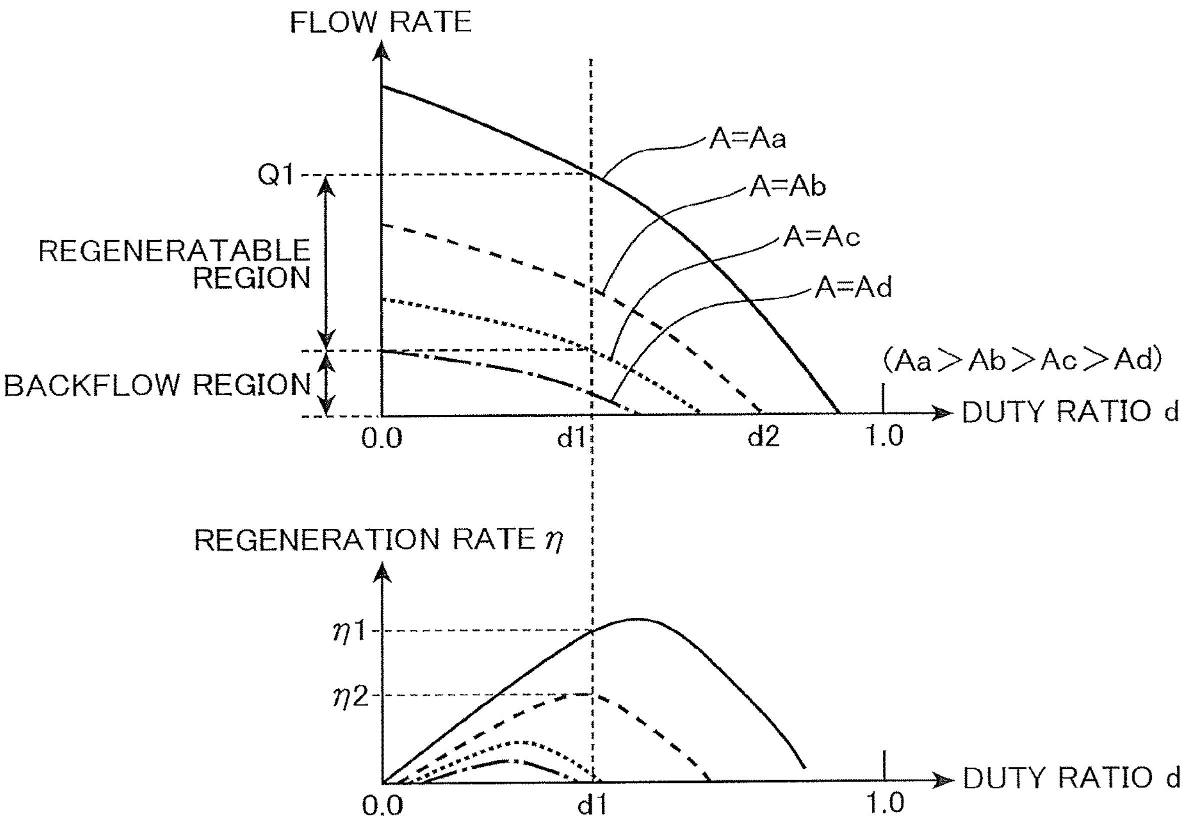
FIG. 6 includes graphs showing relationships between a duty ratio for controlling an opening area of each opening/closing device included in the energy regeneration device according to the one embodiment of the present invention, and each of a flow rate of a working fluid and an energy regeneration rate.

Next, with reference to FIGS. 5 and 6, together with FIGS. 2 to 4, an energy regenerating process in the regeneration device 100 will be described. FIG. 5 includes graphs showing relationships each between an open time and an opening degree of the low-pressure-side opening/closing device 103 and the high-pressure-side opening/closing device 104 which are included in the regeneration device 100. FIG. 6 includes graphs showing relationships between a duty ratio for controlling an opening area of each of the low-pressure-side opening/closing device 103 and the high-pressure-side opening/closing device 104 which are included in the regeneration device 100 according to the present embodiment, and each of a flow rate of a hydraulic fluid and an energy regeneration rate.

In the regeneration device 100, when the controller 106 closes an opening of the high-pressure-side opening/closing device 104 and opens an opening of the low-pressure-side opening/closing device 103, a hydraulic fluid in the inertial fluid container 102 flows into the oil tank 110. At that time, because of flow of a hydraulic fluid, an inertial force of fluid is generated in the internal space of the inertial fluid container 102. Subsequently, when the controller 106 closes an opening of the low-pressure-side opening/closing device 103 and opens an opening of the high-pressure-side opening/closing device 104, a hydraulic fluid can flow into, and be accumulated in, the accumulator 105 because of an inertial force of fluid generated in the inertial fluid container 102 in the above-described manner. Additionally, even if a pressure of the accumulator 105 is equal to or higher than a pressure of the inertial fluid container 102, a hydraulic fluid can flow into, and be accumulated in, the accumulator 105 as long as an inertial force of fluid is maintained in the inertial fluid container 102.

It is noted that an inertial force of fluid in the inertial fluid container 102 is reduced with time. Hence, the controller 106 again closes the high-pressure-side opening/closing device 104 and opens the low-pressure-side opening/closing device 103, to thereby restore an inertial force of fluid. For this reason, the controller 106 alternates an opening/closing period of the low-pressure-side opening/closing device 103 with an opening/closing period of the high-pressure-side opening/closing device 104 in a regular period. With this configuration, it is possible to regenerate energy and accumulate it in the accumulator 105 even if a pressure of the accumulator 105 is equal to or higher than a pressure of the head-side hydraulic chamber 203 of the boom cylinder 20.

With reference to FIG. 5, in operations for energy regeneration, the controller 106 alternates an operation of opening and shutting down the low-pressure-side opening/closing device 103, with an opening/closing operation of the high-pressure-side opening/closing device 104 at a high speed. More specifically, as shown in FIG. 4, the regeneration control unit 153 of the controller 106 includes a control-current output unit, a PWM converter, and a driving circuit. The control-current output unit outputs a pulse signal for controlling an opening/closing operation of the low-pressure-side opening/closing device 103 and the high-pressure-side opening/closing device 104. In this regard, the pulse signal is formed of a predetermined rectangular wave, and an opening/closing time of each of the low-pressure-side opening/closing device 103 and the high-pressure-side opening/closing device 104 is controlled by a duty ratio d of the pulse signal. With reference to FIG. 5, the duty ratio d is defined by the following formula 1. In the formula, T1 represents a time of one cycle (period) in which each of the low-pressure-side opening/closing device 103 and the high-pressure-side opening/closing device 104 is opened and then closed, and T2 represents a time in which the high-pressure-side opening/closing device 104 is opened in one cycle. That is, the duty ratio d defined by the formula 1 corresponds to the duty radio d1 for a high-pressure side for controlling an open time of the high-pressure-side opening 104 in the period T1. Also, in one example, a frequency of a pulse signal for controlling an opening/closing operation of the low-pressure-side opening/closing device 103 and the high-pressure-side opening/closing device 104 is set to 100 Hz.

[Formula 1]

$$d = \frac{T2}{T1} \tag{1}$$

It is noted that a time in which the low-pressure-side opening/closing device 103 is opened is equal to T1-T2. Accordingly, a low-pressure-side duty ratio d2 for controlling an open time of the low-pressure-side opening 103 in the period T1 is equal to 1−d1. Also, in FIG. 5, an opening area of each of the low-pressure-side opening/closing device 103 and the high-pressure-side opening/closing device 104 each of which includes a metering valve is controlled depending on a magnitude of a voltage of a pulse signal (a peak value, a vertical axis of the graph in FIG. 7). In this manner, a destination of flow of a hydraulic fluid is switched between the accumulator 105 and the oil tank 110 at a high speed, so that flow of a hydraulic fluid discharged from the boom cylinder 20 can be stably maintained.

It is noted that in a stage of design of the regeneration device 100, a maximum opening area Amax of each of the low-pressure-side opening/closing device 103 and the high-pressure-side opening/closing device 104 is set in the following manner. The maximum opening area Amax of each of the low-pressure-side opening/closing device 103 and the high-pressure-side opening/closing device 104 is designed by an formula 2 in which Qmax represents a maximum flow rate of a hydraulic fluid discharged from the boom cylinder 20, and d1 (0<d1<1) represents a desired duty ratio for controlling an opening/closing time of the low-pressure-side opening/closing device 103 and the high-pressure-side opening/closing device 104.

[Formula 2]

$$Amax = \frac{Qmax}{\{Cv \times \sqrt{(Ph0 - d1 \times Pacc0)}\}} \tag{2}$$

Ph represents a discharge pressure of a hydraulic fluid, the discharge pressure being measurable by the first pressure gauge 111 (FIG. 3), and Ph0 in the formula 2 represents a discharge-pressure design value for determining Amax in a stage of design. It is noted that when the hydraulic excavator 10 is actually operated, the discharge pressure Ph varies depending on an inertial force at an accelerating/decelerating time of the boom 17, or on presence or absence of a load on the boom 17. Accordingly, in a stage of design of the regeneration device 100, the discharge-pressure design value Ph0 is calculated by the following formula 3 in which M represents a mass of the boom 17 corresponding to a reference load on the boom cylinder 20 and Ah represents a head-side area of the boom cylinder 20. It is noted that g in the formula 3 represents gravitational acceleration.

[Formula 3]

$$Ph0 = \frac{M \times g}{Ah} \tag{3}$$

Further, though also the accumulator pressure Pacc varies during operation of the hydraulic excavator 10, the maximum pressure measured by the second pressure gauge 112 during an operation can be assumed to be an accumulator pressure PaccO used for a stage of design.

FIG. 6 shows a flow rate of a hydraulic fluid and a regeneration rate (efficiency of regeneration η) in a case where the opening area A of each of the low-pressure-side opening/closing device 103 and the high-pressure-side opening/closing device 104 is varied as a control parameter and the duty ratio d of a pulse signal is varied. Also, FIG. 6 shows graphs in respective cases where an opening area of each of the low-pressure-side opening/closing device 103 and the high-pressure-side opening/closing device 104 is set to Aa, Ab, Ac, and Ad. In this regard, a relation of Aa>Ab>Ac>Ad is satisfied. It is noted that the regeneration rate η indicates a rate at which energy of a hydraulic fluid discharged from the boom cylinder 20 is recovered in the accumulator 105, and is defined by the following formula 4.

[Formula 4]

$$\eta = \frac{Qacc \times Pacc}{Qh \times Ph} \tag{4}$$

In the formula 4, Qacc represents a flow rate of a hydraulic fluid which flows into the accumulator 105, and Qh represents a flow rate of a hydraulic fluid which flows out of the head-side hydraulic chamber 203 of the boom cylinder 20. Pace represents an accumulator pressure which is measured by the second pressure gauge 112, and Ph represents a discharge pressure of a hydraulic fluid, the discharge pressure being measured by the first pressure gauge 111.

With reference to FIG. 6, a flow rate of a hydraulic fluid decreases as the duty ratio d becomes closer to 1.0, and a flow rate of a hydraulic fluid increases as the duty ratio d becomes closer to zero. Accordingly, it is preferable to bring the duty ratio d closer to zero in order to maintain a high flow rate of a hydraulic fluid. However, the regeneration rate η is reduced as the duty ratio d becomes closer to zero, as shown in FIG. 6. This is because a condition for making the duty ratio d equal to zero is a state in which the low-pressure-side opening/closing device 103 is always opened and the high-pressure-side opening/closing device 104 is always closed. Thus, a desired value of the duty ratio d is between zero and one in order to encourage compatibility between a flow rate of a hydraulic fluid and the regeneration rate η, and it is preferable that the desired duty ratio d1 is set to a region close to a medium (0.5), especially, a range of $0.3 \leq d1 \leq 0.7$.

Figure 7:
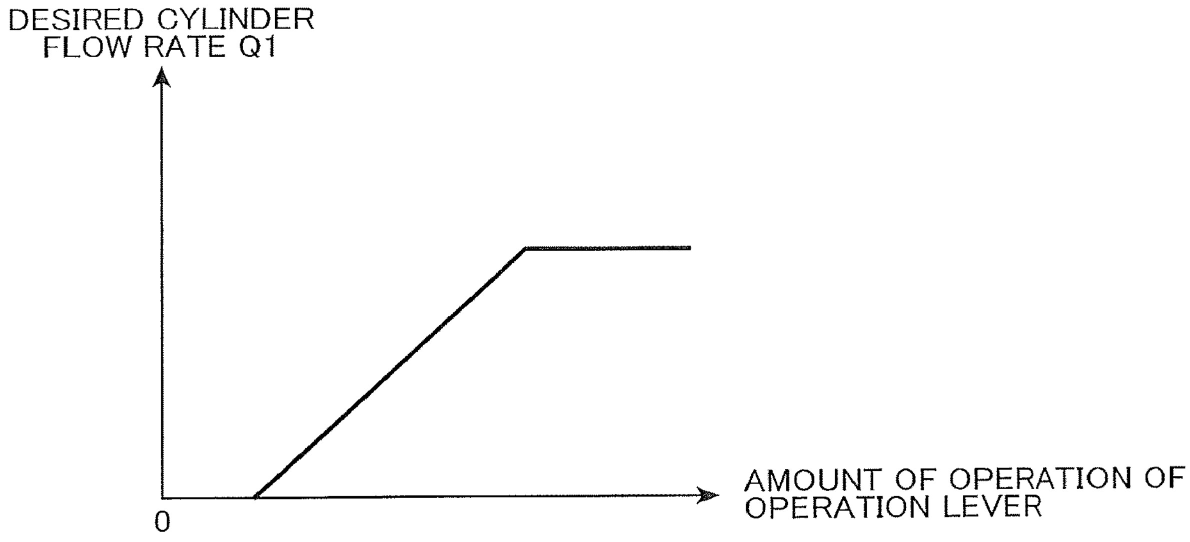
FIG. 7 is a graph showing a relationship between an amount of operation of an operation lever of the work machine according to the one embodiment of the present invention, and a desired flow rate of a working fluid.

Next, operations for a regenerating process performed by the controller 106 when the hydraulic excavator 10 is operated will be described. FIG. 7 is a graph showing a relationship between an amount of operation of the operation lever 107 and a desired cylinder flow rate Q1 in the hydraulic excavator 10 according to the present embodiment. Data corresponding to the graph in FIG. 7 is stored in the storage unit 152 (FIG. 4) of the controller 106. The desired cylinder flow rate Q1 is equal to a flow rate of a hydraulic fluid which is discharged from the boom cylinder 20 so that the piston 202 can move at a predetermined speed in accordance with an amount of operation of the operation lever 107.
In order for an operator of the hydraulic excavator 10 to operate the boom 17, a moving speed of the boom 17 is set in accordance with an amount of operation of the operation lever 107. A moving speed of the piston 202 of the boom cylinder 20 is set to be equal to a required moving speed of the boom 17, so that high operability for an operator is maintained. In the present embodiment, with a moving speed (a flow rate of discharged hydraulic fluid) of the boom 17 (the piston 202) being made controllable, the controller 106 performs operations for the regenerating process in order to recover energy of discharged hydraulic fluid in the accumulator 105.

Figure 8:
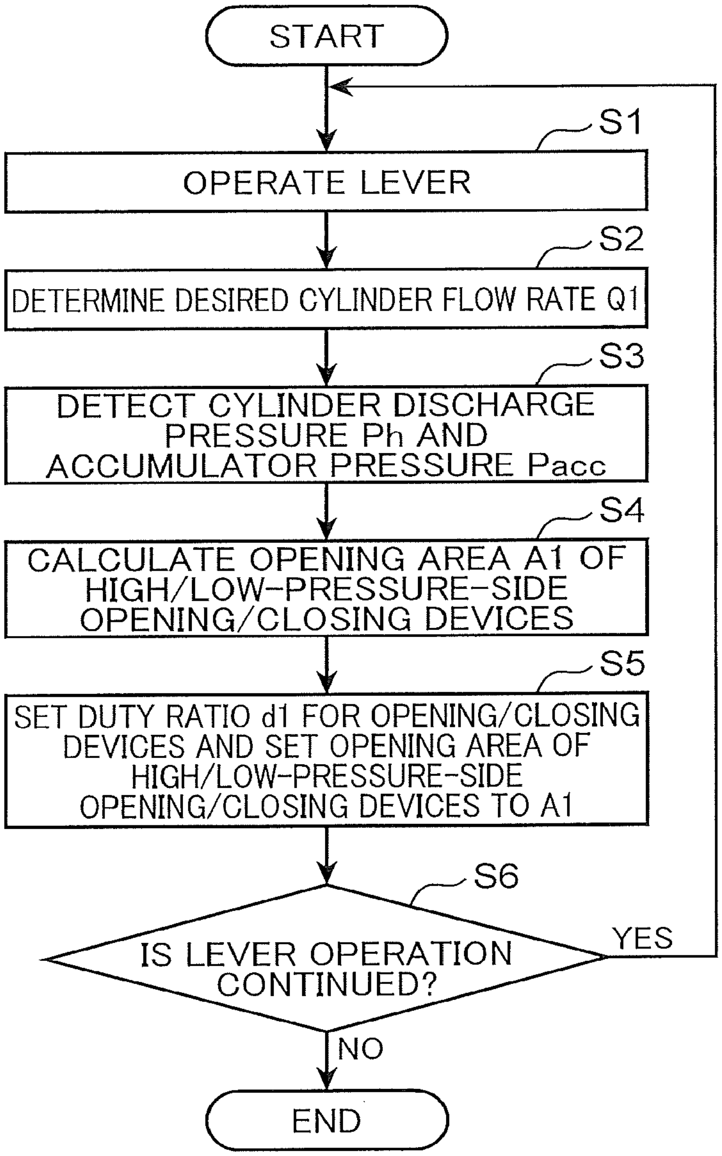
FIG. 8 is a flowchart showing a regenerating process performed by the energy regeneration device according to the one embodiment of the present invention.

FIG. 8 is a flowchart showing operations for the regenerating process performed by the regeneration device 100 according to the present embodiment. A lever operation is performed on the operation lever 107 by an operator of the hydraulic excavator 10 (step S1 in FIG. 8). It is noted that in the present embodiment, the controller 106 performs operations for the regenerating process when an operator lifts down the boom 17, in other words, when the piston 202 moves downward and a volume of the head-side hydraulic chamber 203 is reduced in FIG. 3. When the boom 17 is operated such that it moves downward through the operation lever 107, the controller 106 then determines the desired cylinder flow rate Q1 (a flow rate of discharged hydraulic fluid) based on the information (relational formula) in FIG. 7, the information being stored in the storage unit 152 (step S2 in FIG. 8).

Subsequently, the controller 106 controls the first pressure gauge 111 and the second pressure gauge 112, so that the cylinder discharge pressure Ph and the accumulator pressure Pace are respectively detected (step S3 in FIG. 8).

Further, the calculation unit 151 of the controller 106 calculates the desired opening area A1 from the duty ratio d1 which is previously set and stored in the storage unit 152, in addition to the desired cylinder flow rate Q1 determined in step S2, the cylinder discharge pressure Ph and the accumulator pressure Pacc which are detected in step S3, using an formula 5 (step S4 in FIG. 8).

[Formula 5]

$$A1 = \frac{Q1}{\{Cv \times \sqrt{(Ph - d1 \times Pacc)}\}} \tag{5}$$

It is noted that Cv represents a flow coefficient (constant) of a valve forming each of the low-pressure-side opening/closing device 103 and the high-pressure-side opening/closing device 104. Also, in the present embodiment, respective opening areas to be calculated, of the low-pressure-side opening/closing device 103 and the high-pressure-side opening/closing device 104, are identical to each other.

Subsequently, the controller 106 sets an opening area of an opening of each of the low-pressure-side opening/closing device 103 and the high-pressure-side opening/closing device 104 to the opening area A1 calculated in step S4, and controls an opening/closing operation of the high-pressure-side opening/closing device and an opening/closing operation of the low-pressure-side opening/closing device alternately in accordance with the duty ratio d1 (step S5 in FIG. 8).

Thereafter, if an operator continues to operate the operation lever 107 (YES in step S6), the controller 106 repeats operations for the regenerating process in accordance with an amount of operation of the operation lever 107 from step S1. On the other hand, if an operation of the operation lever 107 is finished (NO in step S6), the controller 106 finishes operations for the regenerating process.

As described above, in the present embodiment, the calculation unit 151 of the controller 106 calculates the desired opening area A1 of each of the high-pressure-side opening and the low-pressure-side opening for a case where the piston 202 of the boom cylinder 20 moves at a predetermined moving speed in such a direction as to reduce a volume of the head-side hydraulic chamber 203. At that time, the calculation unit 151 calculates the desired opening area A1 of each of the low-pressure-side opening/closing device 103 and the high-pressure-side opening/closing device 104, the desired opening area A1 depending on the desired flow rate Q1, based on the duty ratio d1 for controlling an open time of the low-pressure-side opening/closing device 103 and an open time of the high-pressure-side opening/closing device 104 in a predetermined period, the desired flow rate Q1 of a hydraulic fluid, the desired flow rate being set in accordance with the moving speed of the piston 202, the discharge pressure Ph detected by the first pressure gauge 111, and the high-pressure-side pressure Pace (accumulator pressure) detected by the second pressure gauge 112. Then, the regeneration control unit 153 of the controller 106 sets an opening area of each of the low-pressure-side opening/closing device 103 and the high-pressure-side opening/closing device 104 to the desired opening area A1 and controls an opening/closing operation of the low-pressure-side opening/closing device 103 and the high-pressure-side opening/closing device 104 in accordance with the duty ratio d1 in such a manner that the oil tank 110 and the accumulator 105 are alternately selected as a destination with which the inertial fluid container 102 communicates. As a result of this, the regeneration control unit 153 causes a hydraulic fluid to flow into the accumulator 105 due to an inertial force which is generated in an internal space of the inertial fluid container 102 when the hydraulic fluid flows toward the oil tank 110, while causing the piston 202 to move at a desired moving speed. By the above-described process, energy of a hydraulic fluid discharged from the boom cylinder 20 can be recovered in the accumulator 105, and also, a discharge flow rate of the boom cylinder 20 can be controlled. Accordingly, in a work machine such as the hydraulic excavator 10, it is possible to control an operation speed of the boom cylinder 20 in accordance with an amount of operation performed on the operation lever 107 by an operator. It is noted that even in a case where the discharge pressure Ph of the boom cylinder 20 is higher than the accumulator pressure Pace of the accumulator 105, energy of a hydraulic fluid discharged from the boom cylinder 20 can be recovered in the accumulator 105 by the above-described control of regeneration.

Also, in the present embodiment, it is possible to recover energy of a hydraulic fluid discharged from the boom cylinder 20 in the accumulator 105 while keeping the desired opening areas A1 of the low-pressure-side opening/closing device 103 and the high-pressure-side opening/closing device 104 identical to each other. Especially, an area of a section of an opening is not changed when a destination of flow of a working fluid, the destination communicating with the inertial fluid container 102, is switched between the low-pressure-side opening/closing device 103 and the high-pressure-side opening/closing device 104, and thus flow of a hydraulic fluid can be stably maintained.

Now, with reference to FIG. 6, comparison is made between a case where the duty ratio d is kept constant and the desired opening area A is varied in controlling the regeneration device 100 in the same manner as in the present embodiment and a case where the desired opening area A is kept constant and the duty ratio d is varied. In FIG. 6, when the opening area A is fixed at A2 and the duty ratio d is controlled in a range of zero to d2 for the maximum desired flow rate Q1, the desired flow rate Q can be controlled in a range of zero to Q1. In this case, the regeneration rate η becomes equal to η2 as shown in FIG. 6. On the other hand, when the duty ratio d is fixed at d1 and the opening area A is controlled in a range of zero to A1 for the maximum desired flow rate Q1, the desired flow rate Q can be controlled in a range of zero to Q1. In this case, the regeneration rate η becomes equal to η1 as shown in FIG. 6. Because of η1>η2, a higher regeneration rate η can be attained in the case where the duty ratio d is kept constant and the desired opening area A is varied in the same manner as in the present embodiment.

Hereinabove, the regeneration device 100 according to the embodiment of the present invention and the hydraulic excavator 10 including the foregoing device have been described. With the above-described hydraulic excavator 10, it is possible to regenerate energy of a hydraulic fluid discharged from the boom cylinder 20 while controlling a flow rate of the hydraulic fluid in accordance with an amount of operation performed on the operation lever 107 by an operator.

It should be noted that the present invention is not limited to the above-described embodiment. As construction equipment according to the present invention, the following modified embodiments are possible.

Figure 9:
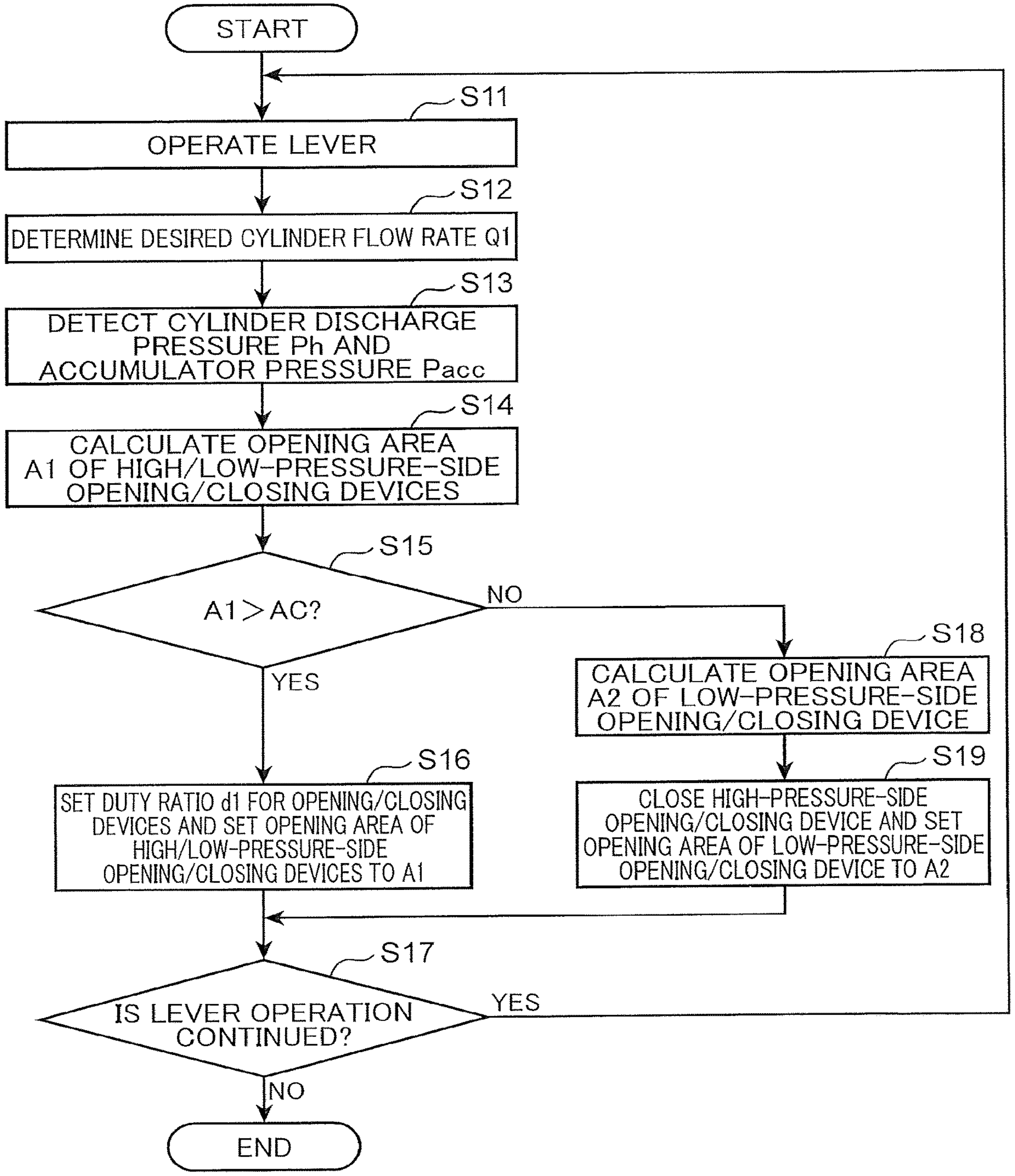
FIG. 9 is a flowchart showing a regenerating process performed by an energy regeneration device according to a modified embodiment of the present invention.

(1) Though it has been described in the above-described embodiment that when the calculation unit 151 (FIG. 4) calculates the opening area A1 in step S4 in FIG. 8, the regeneration control unit 153 (FIG. 4) sets an opening area and a duty ratio for each of the low-pressure-side opening/closing device 103 and the high-pressure-side opening/closing device 104 (step S5 in FIG. 8), the present invention is not limited to that. FIG. 9 is a flowchart showing a regenerating process performed by the regeneration device 100 (energy regeneration device) according to a modified embodiment of the present invention. In the present modified embodiment, differences from the foregoing embodiment will be described and description of similar points will be omitted.

Features of the present modified embodiment lie in inclusion of a function of preventing backflow of a hydraulic fluid from the accumulator 105 to the inertial fluid container 102 before it occurs. As shown in FIG. 6, as the opening area A of each of the low-pressure-side opening/closing device 103 and the high-pressure-side opening/closing device 104 becomes smaller (Aa→Ad), the regeneration rate η decreases. In FIG. 6, in a case where a duty ratio is set to d1, the regeneration rate becomes equal to zero when an opening area is smaller than Ac, so that backflow from the accumulator 105 (FIG. 3) to the boom cylinder 20 occurs. In the present embodiment, a regeneratable limit opening area AC (threshold value, Ac in FIG. 6) which is a limit below (condition under) which such backflow will not occur is previously obtained by experiments or analysis, and is stored in the storage unit 152 (FIG. 4).

In FIG. 9, steps S11 to S14 correspond to steps S1 to S4 in FIG. 8. Then, in step S15, if the desired opening area A1 calculated by the calculation unit 151 exceeds the regeneratable limit opening area AC (YES in step S15), the regeneration control unit 153 exercises control in the same manner as in the foregoing embodiment (steps S16 and S17 in FIG. 9). On the other hand, if the desired opening area A1 which is calculated is equal to or smaller than the regeneratable limit opening area AC (NO in step S15), the calculation unit 151 calculates an anti-backflow opening area A2 based on the following formula 6, firstly (step S18). It is noted that the formula 6 corresponds to a case where the duty ratio d1 is equal to zero in the above-described formula 5. In other words, the formula 6 corresponds to a case where an open time of the high-pressure-side opening/closing device 104 is equal to zero in the formula 5. Additionally, in another modified embodiment, the anti-backflow opening area A2 may be previously calculated and stored in the storage unit 152. At that time, the anti-backflow opening area A2 is set to a range equal to or larger than the above-described regeneratable limit opening area AC.

[Formula 6]

$$A2 = \frac{Q1}{\{Cv \times \sqrt{(Ph)}\}} \quad (6)$$

Further, the regeneration control unit 153 closes an opening of the high-pressure-side opening/closing device 104 and sets the opening area A of an opening of the low-pressure-side opening/closing device 103 to the anti-backflow opening area A2 which is calculated in the above-described manner (step S19 in FIG. 9). As a result of this, without regeneration of a hydraulic fluid, a hydraulic fluid is discharged into the oil tank 110 while being maintained at a desired flow rate. Thereafter, operations for the regenerating process are repeated depending on an operation state of the operation lever 107 in the same manner as in the foregoing embodiment.

As described above, according to the present modified embodiment, in a region where the desired flow rate Q1 of a hydraulic fluid is so large that a hydraulic fluid can be regenerated (refer to FIG. 6), energy of the boom cylinder 20 can be regenerated for the accumulator 105. On the other hand, under conditions where it is difficult to regenerate a hydraulic fluid because the desired flow rate Q1 of a hydraulic fluid is small, backflow from the accumulator 105 to the boom cylinder 20 can be prevented. As a consequence, useless outflow of energy of pressure oil accumulated in the accumulator 105 is suppressed, so that an effect of stably regenerating energy can be achieved. Additionally, in order to surely prevent backflow of a hydraulic fluid from the accumulator 105 toward the boom cylinder 20, a check valve not shown in the drawings may be provided upstream or downstream of the high-pressure-side opening/closing device 104. Also, since an opening area during backflow of a hydraulic fluid from the accumulator 105 toward the boom cylinder 20 varies depending on the duty ratio d, it is preferable that the opening-area threshold value AC is set in accordance with the duty ratio d and is stored in the storage unit 152. Thus, backflow of a hydraulic fluid can be more accurately prevented.

(2) Also, though it has been described in each of the above-described embodiments that the first pressure gauge 111 actually measures Ph (discharge pressure), the present invention is not limited to those embodiments. An estimated value of Ph which is obtained by estimation using by the above-described formula 3 may be used for calculation based on the formula 5.

(3) Also, though it has been described in the above-described embodiments that opening areas A of the low-pressure-side opening/closing device 103 and the high-pressure-side opening/closing device 104 are set to an identical area, the present invention is not limited to those embodiments. In step S4 in FIG. 8, the calculation unit 151 can calculate an opening area of each opening using the following formulas 7, 8 and 9 in place of the above-described formula 5.

[Formula 7]

$$A1h = \frac{Q1h}{\{d1 \times Cv \times \sqrt{(Ph - d1 \times Pacc)}\}} \tag{7}$$

[Formula 8]

$$A1r = \frac{Q1r}{\{(1 - d1) \times Cv \times \sqrt{(Ph - d1 \times Pacc)}\}} \tag{8}$$

[Formula 9]

$$Q1 = Q1h + Q1r \tag{9}$$

A1h in the formula 7 represents a desired opening area of the high-pressure-side opening/closing device 104, and A1r in the formula 8 represents a desired opening area of the low-pressure-side opening/closing device 103. Also, in the formula 9, Q1 represents a desired flow rate of a hydraulic fluid discharged from the boom cylinder 20, Q1h represents a flow rate of a part of the hydraulic fluid flowing at the rate Q1, the part passing through the high-pressure-side opening/closing device 104, and Q1r represents a flow rate of a part of the hydraulic fluid flowing at the rate Q1, the part passing through the low-pressure-side opening/closing device 103. The other constants and variables are the same as those in the above-described embodiments. In this manner, according to the present modified embodiment, it is possible to regenerate energy of the boom cylinder 20 for the accumulator 105 while controlling the opening areas A1h and A1r of the high-pressure-side opening/closing device 104 and the low-pressure-side opening/closing device 103 such that they are different from each other.

(4) Also, though the accumulator 105 has been described as a high-pressure-side container of the present invention in the above-described embodiments, the present invention is not limited to those embodiments. For a high-pressure-side container, a configuration in which a known regeneration motor is provided and the regeneration motor is driven to rotate by energy of a working fluid flowing out of the inertial fluid container 102, may be provided. Alternatively, a configuration in which the arm cylinder 22 in FIG. 1 functions as a high-pressure-side container and a hydraulic fluid (working fluid) flowing out of the inertial fluid container 102 is supplied to the arm cylinder 22, may be provided. In this case, a hydraulic fluid being supplied facilitates an operation of pushing an arm.

As described above, the present invention provides an energy regeneration device for regenerating energy of a working fluid, including: an actuator including a cylinder and a piston that is reciprocatable in the cylinder, the actuator being configured such that a volume of a cylinder fluid chamber delimited by the cylinder and the piston varies along with movement of the piston; an inertial fluid container including a first internal space that is configured to communicate with the cylinder fluid chamber, the inertial fluid container being configured to receive the working fluid that is discharged from the cylinder fluid chamber due to the movement of the piston; a low-pressure-side container including a second internal space that is set at a pressure lower than that of the cylinder fluid chamber and is configured to communicate with the first internal space of the inertial fluid container, the low-pressure-side container being configured to receive the working fluid flowing out of the inertial fluid container; a high-pressure-side container including a third internal space that is set at a pressure higher than that of the second internal space of the low-pressure-side container and is configured to communicate with the first internal space of the inertial fluid container, the high-pressure-side container being configured to receive the working fluid flowing out of the inertial fluid container; a low-pressure-side opening/closing device forming a low-pressure-side opening that is configured to permit circulation of the working fluid between the inertial fluid container and the low-pressure-side container, the low-pressure-side opening/closing device being configured to operate to vary an opening area of the low-pressure-side opening; a high-pressure-side opening/closing device forming a high-pressure-side opening that is configured to permit circulation of the working fluid between the high-pressure-side container and the inertial fluid container, the high-pressure-side opening/closing device being configured to operate to vary an opening area of the high-pressure-side opening; a first pressure obtaining unit configured to obtain a discharge pressure of the working fluid upstream of the inertial fluid container in flow of the working fluid flowing out of the cylinder fluid chamber; a second pressure obtaining unit configured to obtain a high-pressure-side pressure of the working fluid downstream of the high-pressure-side opening/closing device in the flow of the working fluid flowing out of the cylinder fluid chamber; a calculation unit configured to calculate a desired opening area of each of the high-pressure-side opening and the low-pressure-side opening for a case where the piston moves at a predetermined moving speed in such a direction as to reduce the volume of the cylinder fluid chamber, the calculation unit being configured to calculate the desired opening area of each of the high-pressure-side opening and the low-pressure-side opening based on a duty ratio for controlling an open time of each of the low-pressure-side opening and the high-pressure-side opening in a predetermined period, a desired flow rate of the working fluid discharged from the cylinder fluid chamber, the desired flow rate being set in accordance with the moving speed of the piston, the discharge pressure obtained by the first pressure obtaining unit, and the high-pressure-side pressure obtained by the second pressure obtaining unit; and an opening/closing-device control unit configured to set the opening area of each of the high-pressure-side opening and the low-pressure-side opening to the desired opening area, and control an opening/closing operation of the high-pressure-side opening/closing device and the low-pressure-side opening/closing device in accordance with the duty ratio such that the low-pressure-side container and the high-pressure-side container are alternately selected as a destination with which the inertial fluid container communicates, to cause the working fluid to flow into the high-pressure-side container due to an inertial force that is generated in the first internal space of the inertial fluid container when the working fluid flows toward the low-pressure-side container, while causing the piston to move at the moving speed.

With this configuration, the opening/closing-device control unit controls an opening/closing operation of the high-pressure-side opening/closing device and the low-pressure-side opening/closing device in accordance with the desired opening area calculated by the calculation unit and the duty ratio which is previously set. As a result of this, energy of the working fluid discharged from the actuator can be recovered in the high-pressure-side container, and a discharge flow rate of the actuator can be controlled.

In the above-described configuration, it is preferable that the opening/closing-device control unit sets the opening areas of the high-pressure-side opening and the low-pressure-side opening to an identical opening area in accordance with the desired flow rate of the working fluid, and the calculation unit calculates the desired opening area A1 based on a relational formula of $A1=Q1/Cv\times\sqrt{(Ph-d1\times Pace)}$ in which A1 represents the desired opening area, Ph represents the discharge pressure of the working fluid, the discharge pressure being obtained by the first pressure obtaining unit, Pace represents the high-pressure-side pressure of the working fluid, the high-pressure-side pressure being obtained by the second pressure obtaining unit, Q1 represents the desired flow rate of the working fluid, d1 represents the duty ratio, and Cv represents a constant that is previously set for the high-pressure-side opening/closing device and the low-pressure-side opening/closing device.

With this configuration, energy of a working fluid discharged from the actuator can be recovered in the high-pressure-side container while the opening areas of the high-pressure-side opening/closing device and the low-pressure-side opening/closing device are kept identical to each other. Especially, when a destination of flow of the working fluid, the destination communicating with the inertial fluid container, is switched between the high-pressure-side opening/closing device and the low-pressure-side opening/closing device, flow of the working fluid can be stably maintained. Also, by switching a destination of flow of the working fluid between the high-pressure-side container and the low-pressure-side container at a high speed, it is possible to stably maintain flow of the working fluid discharged from the actuator.

In the above-described configuration, it is preferable that further included is a storage unit in which a threshold value that is previously set for the opening area of each of the high-pressure-side opening and the low-pressure-side opening is stored, and when the desired opening area calculated by the calculation unit is equal to or smaller than the threshold value, the opening/closing-device control unit closes the high-pressure-side opening of the high-pressure-side opening/closing device and sets the area of the low-pressure-side opening of the low-pressure-side opening/closing device to an anti-backflow opening area that is previously set to a range equal to or larger than the threshold value.

With this configuration, backflow of the working fluid from the high-pressure-side container toward the actuator can be suppressed.

In the above-described configuration, it is preferable that further included is a storage unit in which a threshold value that is previously set for the opening area of each of the high-pressure-side opening and the low-pressure-side opening is stored, and when the desired opening area calculated by the calculation unit is equal to or smaller than the threshold value, the calculation unit calculates the desired opening area by using the duty ratio that is set to zero in the relational formula, and the opening/closing control unit sets the area of the low-pressure-side opening of the low-pressure-side opening/closing device by using the desired opening area that is calculated, as the anti-backflow opening area.

With this configuration, when a destination of flow of a working fluid, the destination communicating with the inertial fluid container, is switched between the high-pressure-side opening/closing device and the low-pressure-side opening/closing device, the flow of the working fluid can be stably maintained, and backflow of the working fluid from the high-pressure-side container toward the actuator can be suppressed.

In the above-described configuration, it is preferable that the high-pressure-side container is an accumulator in which a pressure of the working fluid is accumulated.

With this configuration, after energy of the working fluid discharged from the actuator is accumulated in the accumulator, the energy can be utilized for the other purposes.

A work machine according to another aspect of the present invention includes: an engine; any one of the energy regeneration devices recited above; a driven object connected to the piston of the actuator; a pump being configured to be driven by the engine and drive the driven object connected to the piston by supplying the working fluid to the cylinder fluid chamber of the actuator; and an operation lever configured to operate the driven object, wherein the desired flow rate of the working fluid is set in accordance with an amount of operation of the operation lever.

With this configuration, it is possible to regenerate energy of the working fluid discharged from the actuator while controlling a flow rate of the working fluid in accordance with an amount of operation performed on the operation lever by an operator.

The present invention provides an energy regeneration device which can regenerate energy of a working fluid discharged from an actuator while controlling a flow rate of the working fluid, and a work machine including the foregoing device.

The invention claimed is:

1. An energy regeneration device for regenerating energy of a working fluid, comprising:

an actuator including a cylinder and a piston that is reciprocatable in the cylinder, the actuator being configured such that a volume of a cylinder fluid chamber delimited by the cylinder and the piston varies along with movement of the piston;

an inertial fluid container including a first internal space that is configured to communicate with the cylinder fluid chamber, the inertial fluid container being configured to receive the working fluid that is discharged from the cylinder fluid chamber due to the movement of the piston;

a low-pressure-side container including a second internal space that is set at a pressure lower than that of the cylinder fluid chamber and is configured to communicate with the first internal space of the inertial fluid container, the low-pressure-side container being configured to receive the working fluid flowing out of the inertial fluid container;

a high-pressure-side container including a third internal space that is set at a pressure higher than that of the second internal space of the low-pressure-side container and is configured to communicate with the first internal space of the inertial fluid container, the high-pressure-side container being configured to receive the working fluid flowing out of the inertial fluid container;

a first metering valve forming a low-pressure-side opening that is configured to permit circulation of the working fluid between the inertial fluid container and the low-pressure-side container, the first metering valve being configured to operate to vary an opening area of the low-pressure-side opening;

a second metering valve forming a high-pressure-side opening that is configured to permit circulation of the working fluid between the high-pressure-side container and the inertial fluid container, the second metering valve being configured to operate to vary an opening area of the high-pressure-side opening;

a first pressure gauge configured to obtain a discharge pressure of the working fluid upstream of the inertial fluid container in the flow of the working fluid flowing out of the cylinder fluid chamber;

a second pressure gauge configured to obtain a high-pressure-side pressure of the working fluid downstream of the second metering valve in the flow of the working fluid flowing out of the cylinder fluid chamber; and a controller including a processor configured to calculate a desired opening area of each of the high-pressure-side opening and the low-pressure-side opening for a case where the piston moves at a predetermined moving speed in such a direction as to reduce the volume of the cylinder fluid chamber, the desired opening area of each of the high-pressure-side opening and the low-pressure-side opening being calculated based on a duty ratio for controlling an open time of each of the low-pressure-side opening and the high-pressure-side opening in a predetermined period, a desired flow rate of the working fluid discharged from the cylinder fluid chamber, the desired flow rate being set in accordance with the moving speed of the piston, the discharge pressure obtained by the first pressure gauge and the high-pressure-side pressure obtained by the second pressure gauge; and set the opening area of each of the high-pressure-side opening and the low-pressure-side opening to the desired opening area, and control an opening/closing operation of the second metering valve and the first metering valve in accordance with the duty ratio such that the low-pressure-side container and the high-pressure-side container are alternately selected as a destination with which the inertial fluid container communicates, to cause the working fluid to flow into the high-pressure-side container due to an inertial force that is generated in the first internal space of the inertial fluid container when the working fluid flows toward the low-pressure-side container, while causing the piston to move at the moving speed.

2. The energy regeneration device according to claim 1, wherein the processor of the controller is further configured to set the opening areas of the high-pressure-side opening and the low-pressure-side opening to an identical opening area in accordance with the desired flow rate of the working fluid, and calculate the desired opening area A1 based on a relational formula of $A1=Q1/(Cv\times\sqrt{(Ph-d1\times Pacc)})$ in which A1 represents the desired opening area, Ph represents the discharge pressure of the working fluid, the discharge pressure being obtained by the first pressure gauge, Pacc represents the high-pressure-side pressure of the working fluid, the high-pressure-side pressure being obtained by the second pressure gauge, Q1 represents the desired flow rate of the working fluid, d1 represents the duty ratio, and Cv represents a constant that is previously set for the second metering valve and the first metering valve.

3. The energy regeneration device according to claim 1, wherein the controller includes a memory in which a threshold value that is previously set for the opening area of each of the high-pressure-side opening and the low-pressure-side opening is stored, and wherein when the desired opening area calculated by the processor of the controller is equal to or smaller than the threshold value, the processor of the controller is configured to close the high-pressure-side opening of the second metering valve, and set the opening area of the low-pressure-side opening of the first metering valve to an anti-backflow opening area that is previously set to a range equal to or larger than the threshold value.

4. The energy regeneration device according to claim 2, wherein the controller includes a memory in which a threshold value that is previously set for the opening area of each of the high-pressure-side opening and the low-pressure-side opening is stored, and wherein when the desired opening area calculated by the processor of the controller is equal to or smaller than the threshold value, the processor of the controller is configured to calculate the desired opening area by using the duty ratio d1 that is set to zero in the relational formula, and set the opening area of the low-pressure-side opening of the first metering valve by using the desired opening area that is calculated, as the anti-backflow opening area.

5. The energy regeneration device according to claim 1, wherein the high-pressure-side container is an accumulator in which a pressure of the working fluid is accumulated.

6. A work machine comprising:

an engine;

the energy regeneration device recited in claim 1;

a driven object connected to the piston of the actuator;

a pump being configured to be driven by the engine and drive the driven object connected to the piston by supplying the working fluid to the cylinder fluid chamber of the actuator; and an operation lever configured to operate the driven object, wherein the desired flow rate of the working fluid is set in accordance with an amount of operation of the operation lever.

* * * * *